United States Patent
Derstler et al.

(10) Patent No.: US 8,323,384 B2
(45) Date of Patent: Dec. 4, 2012

(54) AIR FILTER WITH EXTENDED LIFE

(75) Inventors: Ian Joseph Derstler, Columbia, PA (US); Richard Kurcina, Lancaster, PA (US)

(73) Assignee: Clark Filter, Inc., Lancaster, PA (US)

( * ) Notice: Subject to any disclaimer, the term of this patent is extended or adjusted under 35 U.S.C. 154(b) by 388 days.

(21) Appl. No.: 12/641,828

(22) Filed: Dec. 18, 2009

(65) Prior Publication Data

US 2011/0146490 A1    Jun. 23, 2011

(51) Int. Cl.
*B01D 46/00* (2006.01)

(52) U.S. Cl. ............ 95/286; 95/287; 55/385.4; 55/485; 55/487; 55/488; 55/521

(58) Field of Classification Search .............. 95/286, 95/287; 55/385.4, 487, 488, 521, 486, 498, 55/485; 96/17, 57, 58
See application file for complete search history.

(56) References Cited

U.S. PATENT DOCUMENTS

| | | | | |
|---|---|---|---|---|
| 6,056,809 | A * | 5/2000 | Chapman | 96/67 |
| 7,097,694 | B1 * | 8/2006 | Jaroszczyk et al. | 96/17 |
| 2005/0005582 | A1 * | 1/2005 | Gieseke et al. | 55/330 |
| 2009/0126333 | A1 | 5/2009 | Green et al. | |
| 2009/0199717 | A1 | 8/2009 | Green et al. | |

OTHER PUBLICATIONS

Technical Products Group; "Foamex—Filtering Functions—Filtration, Demisting, Humidification, Separation"; Technical Product Function Sheet; undated publication; Technical Products Group, 1500 East Second Street, Eddystone, PA 19022, 03/15/20.

* cited by examiner

*Primary Examiner* — Jason M Greene
*Assistant Examiner* — Karla Hawkins
(74) *Attorney, Agent, or Firm* — Reinhart Boerner Van Deuren P.C.

(57) ABSTRACT

An extended life filter element is provided that may at least double the service interval of a given filtration application utilizing the same or similar filter housing envelope provided. The filter element may include a more open pleated substrate with an efficiency layer and a prefilter on the upstream surface. The filter may be a foam sleeve. One exemplary application is for air filtration of air flow to electrical cabinets on locomotives.

22 Claims, 7 Drawing Sheets

AIR FILTER WITH EXTENDED LIFE

FIELD OF THE INVENTION

The present invention generally relates to filters, such as air filters for dust filtration, and more particularly it relates to filtration medias and methods for extending the lifespan and/or maintenance service interval for periodic replacement of filter elements, or to new filter media arrangements in filter elements generally.

BACKGROUND OF THE INVENTION

Filters are used in a wide variety of applications. For example, air filters are used to remove dust or other particulates from an air flow stream. Such air filters may be used in a variety of applications to include engine filtration, cabin air filtration, dust collection, and other situations where filtered air is desired. In some instances, filter elements may be used for different filtration applications.

As can be appreciated by those of ordinary skill in the art, an air filter has a limited life span that is determined in large part by the air flow restriction imposed by the filter element. For example, over time as a filter element loads with dust or other particulate, it becomes more and more difficult for air to pass through the filtration medium. The "filter cake" that develops on the filter itself starts to act as a filter and often will increase particle capture efficiency. As a consequence, the filter element and dust loaded thereon becomes more restrictive and prevents the air flow that is desired. For example, an insufficient supply of air may be delivered to an engine for combustion or to heat sink for cooling applications if a filter element is loaded past capacity. As a consequence, the dust loading capacity of a filter is normally closely related to the restriction to air flow imposed by that filter element as it loads with dust.

Equally important are other factors. For example, a filter must be sufficiently tight enough to filter out the undesirable particulates that are anticipated for an application and prevent them from passing through. Thus, a tighter pored, more restrictive media is desired for "filtration efficiency" so to ensure that a high percentage of the undesirable particulates are not allowed to pass through. Even further, the dust holding capacity is also related to the designed change-out interval when an air filter element may be replaced (again the dust holding capacity is likely related to the restriction or pressure drop). Thus, while it may seem logical that you could just simply add additional thicker media to provide for an extended filter life, that is not practical for several reasons. First, the addition of filter media typically increases the initial restriction to air flow which again, as mentioned above, is undesirable. Specifically, increased airflow restriction leads to a quicker change-out interval and starting from a higher restriction value is often undesirable. While increased capacity could be provided by increasing the filter size (e.g. length and diameter), additional space is required. Additionally, original equipment manufacturers and/or existing applications may have a limited filter housing envelope size such that there is only a limited space available for packing in a filter element. In many applications, space is a very valuable commodity and making the air filter system as small as possible is often desirable. Filter envelope size is therefore carefully balanced against the anticipated filter replacement maintenance interval.

For example, one problem in the art is a desire to greatly extend the existing filter change-out interval for air filters housed in auxiliary electrical cabinet filter housings to protect the electrical components on a locomotive from dust particulate. In such an application, the existing filter housing volume is already fixed and the existing filter is changed out at an interval approximately 92 days; and there is a desire to develop a filter that can fit the exact same housing and limited envelope contained therein to last 184 days or about double the life and still maintain a 99 percent average arrestance (efficiency of lifespan). In this application, as can be anticipated, the dust particulate is usually expected to consist of diesel soot and outside particulate. The existing filters used for this locomotive electrical cabinet filter application include the AA-1 and AE-1 filters which are produced and sold by the present assignee, Clark Filter, Inc. These filter elements use a single layer of filter media, which is pleated into a cylindrical filter element. For example, the AA-1 filter element has a height of 12.375 inches, an outer diameter of 8 inches and an inner diameter of 4.75 inches. As such, a replacement filter should have same dimensions or otherwise similar dimensions relative to the limited predetermined space in the filter housing. This filter element has a total dust holding capacity of about 122 grams at the final pressure drop (which has been determined to dictate change interval) of 10 inches of water gauge; with an average arrestance of 99.4 percent.

In light of the foregoing, there is a need and desire to greatly extend and if not approximately double the filter change interval for filter elements, while at the same time maintaining the existing filter envelope size, preferably with minimal or no changes to existing filter housings. The present invention is directed toward particular solutions to the present problems posed in the art; which may also find use in other filtration applications. Indeed, for example, the AE-1 filter of Clark Filter is also used in some applications for engine air filtration in addition to being used as an auxiliary electrical cabinet filter, thus the benefits should not be seen as limited or constricted necessarily to one particular application unless explicitly claimed.

BRIEF SUMMARY OF THE INVENTION

One aspect of the present invention may be directed towards a filter element including a filter media ring that includes a substrate and an efficiency layer disposed on a surface of the substrate. The filter media ring has a pleated configuration with first and second end caps disposed on opposing ends thereof. A prefilter is disposed along an upstream surface of the filter media ring.

Additional subsidiary features of the above aspect may include the following. One feature is that the prefilter may be in the form of a depth filter medium to capture particles that are anticipated for the application throughout the depth of that medium. The prefilter has a particle capture efficiency that is less than the efficiency layer, with the efficiency layer having a higher particle capture efficiency than the substrate. The efficiency layer may be on the upstream surface of the substrate. In this manner, the substrate may have a generally open structure that provides for maintaining airflow and does not substantially clog during particulate loading.

Yet another subsidiary feature for some applications may be that the prefilter is a polymeric foam having a thickness of greater than about 0.25 inch and less than about 1 inch and a porosity of between 15 and 25 pore per inch. More preferably, the porosity is about 20 pore per inch and has a convoluted exterior surface. This has been found particularly advantageous for the type of dust and contaminate loading that is expected in locomotive applications, particularly combined with a pleated filter ring with an efficiency layer on a substrate.

Yet another subsidiary feature may include the design of a more open substrate such as a substrate that has a Frazier permeability target of greater than about 85 CFM and a basis weight of between 25 and 150 pounds per 3,000 square feet. The efficiency layer, on the other hand, may be a nanofiber layer on the upstream surface of the substrate comprising fine fibers having an average diameter less than about 500 nanometers (even more preferably less than about 200 nanometers an average fiber diameter) and a relatively low application coverage of less than 0.1 grams per square meter (and more preferably less than 0.04 grams per square meter). The fine fibers take up very little flow area due to their small size (thus highly permeable), and create a high efficiency through small pores, thus satisfying efficiency requirements. Thus, the pleated filter media ring may take the form of a surface loading filter media when the efficiency layer is on the upstream surface of the substrate, whereas the prefilter may take the form of a depth-loading filter that loads throughout its depth.

Yet additional aspects relate to the size limitations and meeting existing application sizes and solving specific needs, such as those discussed in the background section. Extended dust capacities of at least about double despite predetermined filter housing envelope size restraints are disclosed.

Another aspect of the present invention is directed toward a filter apparatus comprising an electrical cabinet on a locomotive housing electrical equipment therein. The filter apparatus includes an air conveyor (e.g. fan or blower) adapted to generate an air flow of at least 300 CFM to the electrical cabinet. An air filter housing having a plurality of openings is in fluid communication with the air conveyor. In this manner, the air conveyor can convey air through the filter housing upstream of the electrical cabinets so as to ensure filtered air is fed into the electrical cabinet. The plurality of filter elements is provided one per each opening in the air filter housing. Each of the filter elements includes a filter media ring and a depth-loading prefilter upstream of the filter media ring with first and second end caps disposed on opposing ends thereof. The filter media ring has a greater particle capture efficiency than the prefilter. Similarly, the above-discussed subsidiary features may also be applicable to this aspect.

Yet another aspect of the present invention relates to a method for providing an extended replacement service interval for a predetermined filter housing envelope of a filter housing that originally contained first filter elements having a single pleated filter media filling out this predetermined filter envelope. The method comprises installing second filter elements (e.g. replacement filters) into the filter housing to fill out the predetermined filter housing envelope. The method also includes selecting second filter elements that have the following characteristics: a pleated filter media having a greater air permeability than the single pleated filter media than the original first filter elements; and a prefilter adapted to depth load upstream of the pleated filter medium to reduce loading on the pleated filter medium.

In accordance with this above aspect, a further feature may involve approximately doubling the replacement service interval with second filter elements as compared with the original filter elements, while at the same time approximately doubling the dust holding capacity while approximately maintaining the same or less air flow resistance at the dust holding capacity. By approximately, it is meant that +/−20 percent is anticipated as it will be appreciated that target maintenance intervals may be slightly adjusted depending upon a variety of factors. Again, one preferred application without limiting thereto unless expressly claimed is locomotive applications and the filtration of air to electrical cabinets on locomotives.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
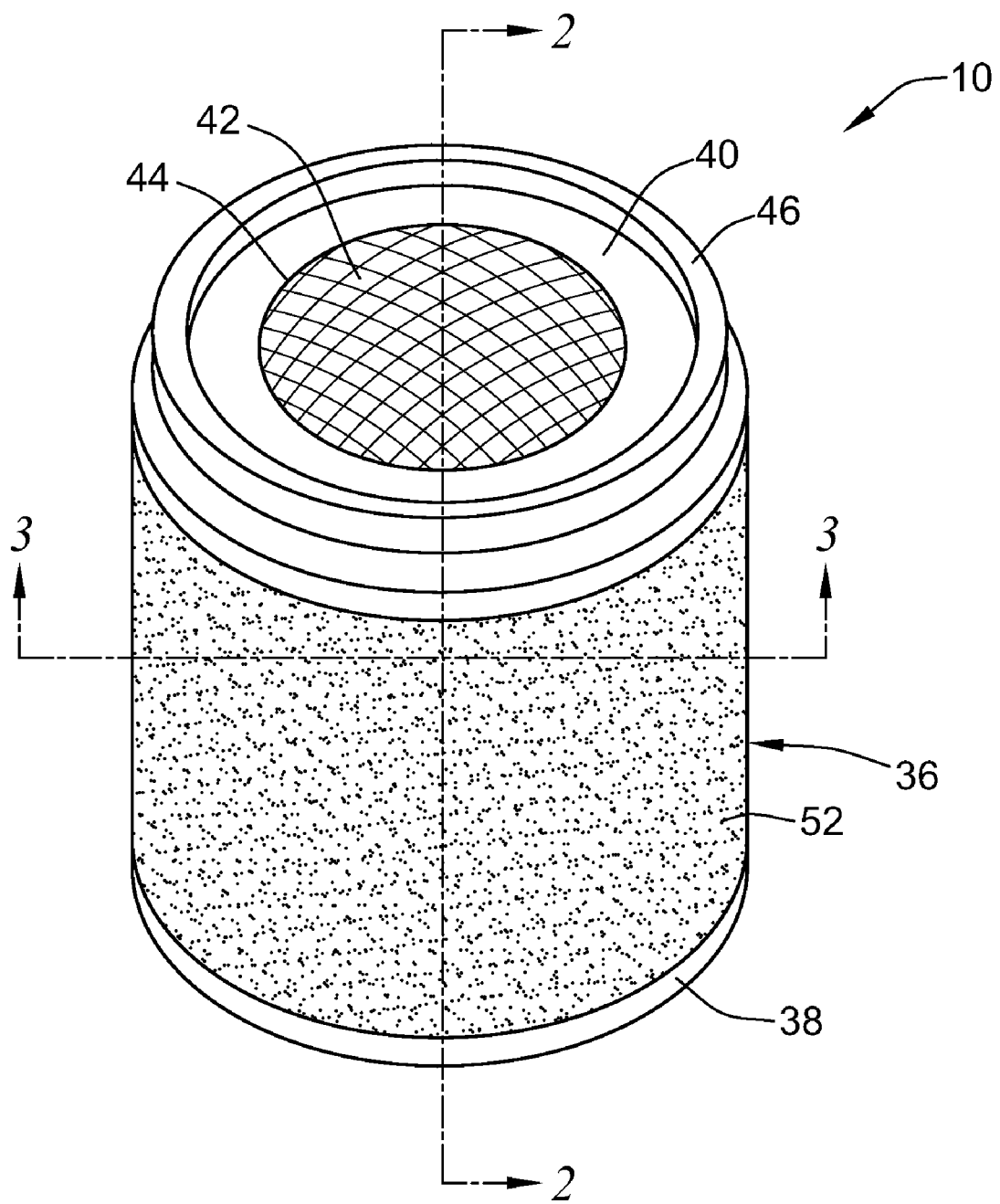
FIG. 1 is a perspective illustration of a filter element in accordance with an embodiment of the present invention.

Turning to FIG. 1, there is illustrated a filter element 10 having an extended life span, according to an embodiment of the present invention. This filter element 10 may be used, for example, in a filtration system environment as shown in FIG. 5.

Figure 5:
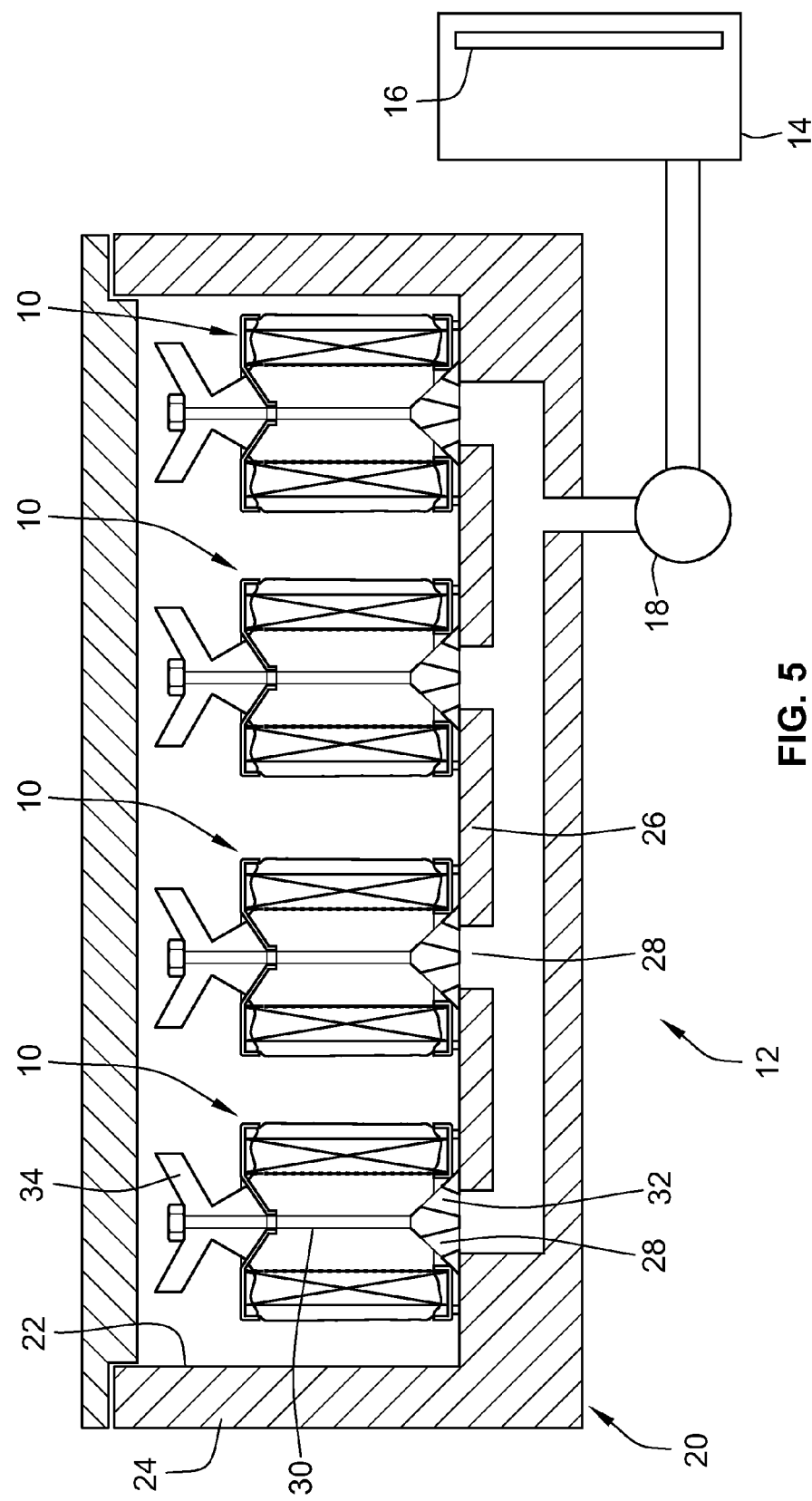
FIG. 5 is a partly-schematic cross-sectional illustration of a filter apparatus including a filter housing and filter elements contained therein with an airflow system to an electrical cabinet housing electronics in a locomotive environment.

As shown in the environment of FIG. 5, the filter element 10 may be employed with other like-filter elements 10 in parallel fluid circuit in a locomotive filter system 12. The particular filter system 12 is illustrated in schematic form for filtering air in a locomotive for air flow running to an electrical cabinet 14 housing electrical equipment 16 therein. The filter system also includes an air conveyor 18 (such as a blower or fan) either upstream or downstream of the filter housing 20 that contains the filter element 10. The air conveyor 18 generates an air flow running to the electrical cabinet 14, but first through the filter elements 10. Typically, in this type of a locomotive environment, the total system air flow (duty cycle average) is at least 100 CFM and typically between 100 and 3000 CFM for total air flow across all filter elements, depending upon the system/model size. Total flow (duty cycle average) across any individual filter element is usually between 100 and 400 CFM. Typically anywhere from 1-8 (for AA-1 filter models) and 5-28 (for AE-1 filter models) filter elements 10 may be employed.

The filter housing 20 may be thus an existing filter housing having a predetermined envelope 22 wherein a fixed volume is defined within the filter housing 20. Additionally, the filter housing 20 may include a box-like casing 24 with a lid to enclose the filter elements. The casing 24 includes a separator plate 26 to divide the casing into a clean air side leading to the electrical cabinet, and a dirty air side wherein ambient unfiltered air is allowed to enter. The separator plate 26 includes openings 28 over which individual filter elements 10 are located and placed in sealing engagement with the separator plate 26. To support and locate the filter elements 10, stand posts 30 (mounted to the separator plate or otherwise to the remainder of housing) may extend concentrically within each opening and include triangular webbing 30 for purposes of concentrically locating the filter elements 10 with respect to the openings and properly locate the seal on the filter elements 10 on the sealing surface that is provided by the separator plate. Wing nuts 34 on the thread end of stand posts 30 may be used to secure and slightly axially compress the filter elements 10 against the separator plate.

Having now described an exemplary environment according to one of the embodiments in which the filter elements 10 may be employed, additional attention will now be directed toward the particular embodiment of the filter element 10 shown in FIGS. 1-5. The filter element 10 may generally include a ring (typically cylindrical) of filter media 36 that extends axially between opposed top and bottom end caps 38, 40. The filter media may be supported axially by a tubular support such as an expanded metal liner 42 that has large openings in it. The expanded metal liner 42 is positioned inside along the inner diameter of the filter media 38 and extends between the top and bottom end caps 38, 40. The expanded metal liner provides dual support both radially to the filter media relative to the radially inward air flow and also axially relative to a slight axial compression that is desired when the filter element 10 is installed and compressed by a wing nut 34. While an inner expanded metal liner 42 is provided, preferably, to make additional room along the outside of the filter element given the fixed envelope size that may be provided for existing applications, no outer metal liner or other outer support is provided such that the filter element may otherwise be free from additional support liners.

As shown, the bottom end cap may be open to include a large inner diameter opening 44 to allow for ready fluid communication with the corresponding opening 28 in the filter housing 20 (see e.g. FIG. 5). Additionally, the opening 44 needs to be large enough to allow it to easily slide over the triangular webbing 32 into location against the separator plate 26 where it is sealed against. To provide for sealing, preferably the bottom end cap either integrally provides or otherwise carries a ring seal gasket 46. As shown, the end caps 38, 40 are shown as metal end caps where the gasket 46 is a separate member that may be glued or adhesably bonded thereto or otherwise mechanically secured (e.g. a groove). The gasket 46 is a elastomeric rubber material that can compress and deform and provide a reliable seal, in this case an axial compression seal with the corresponding filter housing. Alternatively, the gasket and end cap may be integrally formed such as by providing a foamed polyurethane end cap that both bonds/seals the top end of the filter media 36 and also may include a raised circular ridge to provide for a seal integrally in and as part of the end cap. With the metal end caps as shown, it can be seen that each end cap is generally cup-shaped to provide a well in which is received a suitable bonding agent such as plastisol 48 that serves to bond, affix and seal the filter media 36 to each of the top and bottom end caps 38, 40. As shown, the inner metal liner 42 is also potted within the plastisol material and abuts against the opposed end caps 38.

Figure 2:
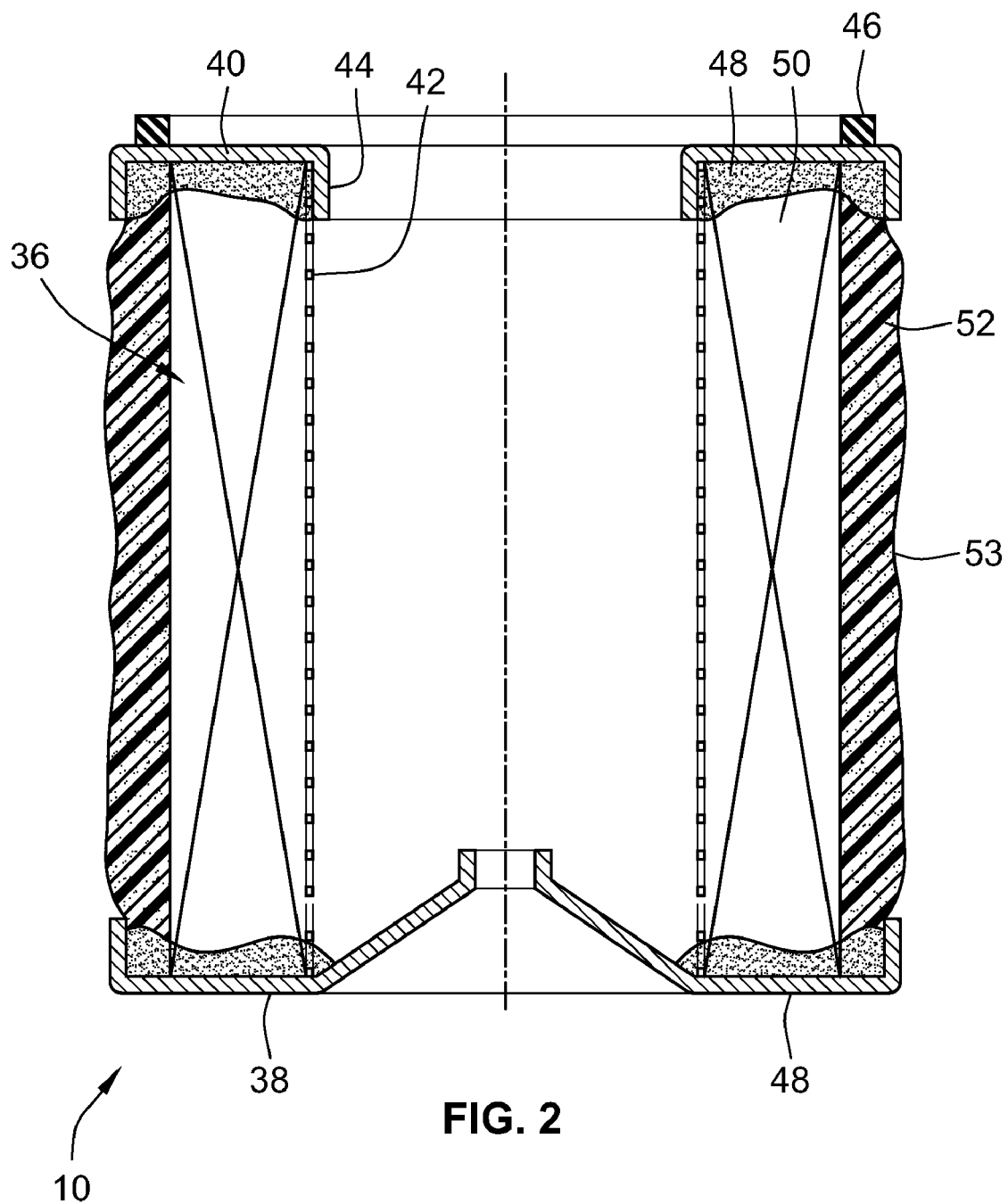
FIG. 2 is a cross-section of the filter element shown in FIG. 1.
Figure 3:
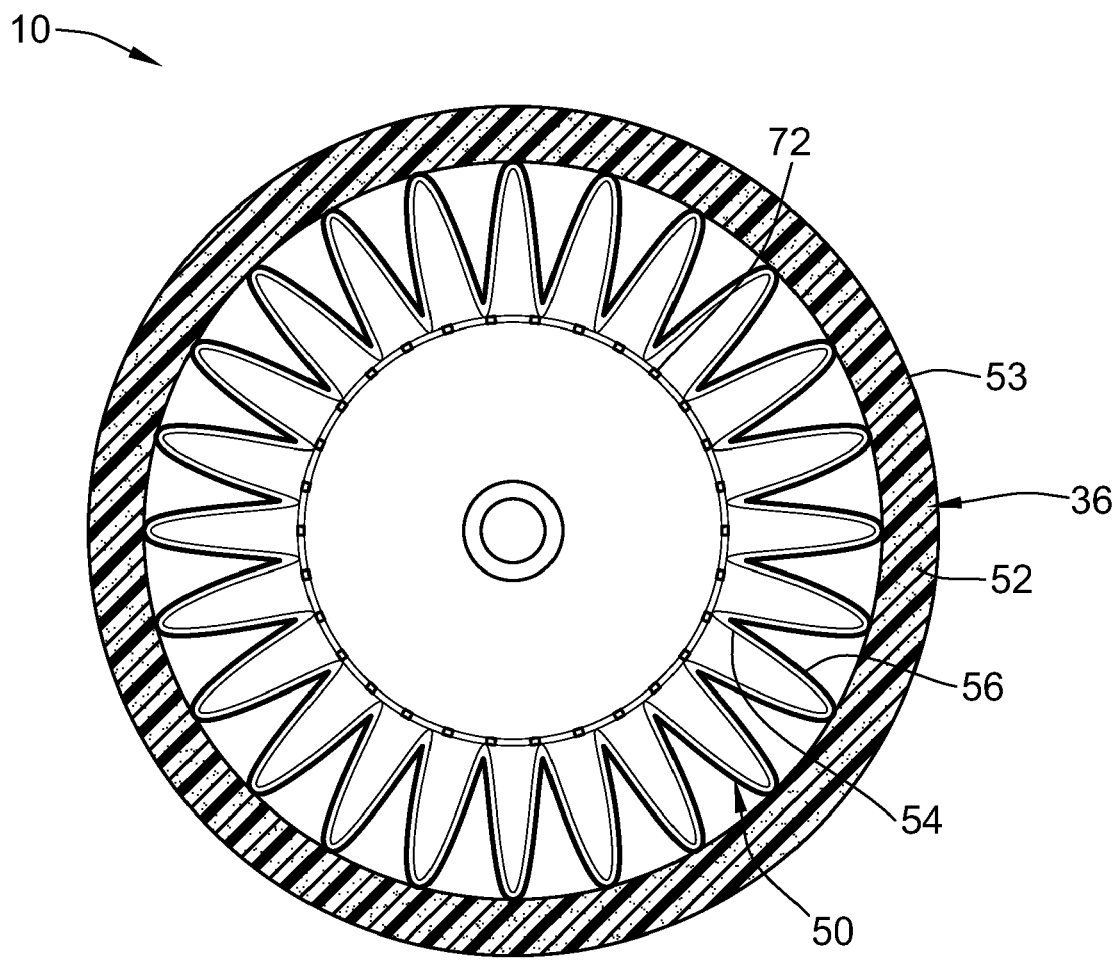
FIG. 3 is a partly schematic (for better showing filter media layers—e.g. the pleats are normally tighter) cross-section of the filter element shown in FIG. 1 in a direction perpendicular to the cross-section taken in FIG. 2.
Figure 4:
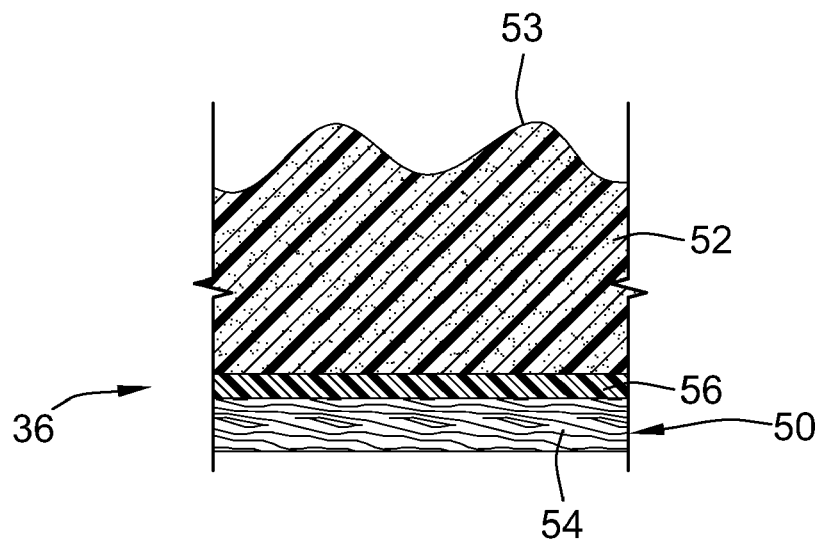
FIG. 4 is a partly schematic illustration (not to scale) showing media layers taken at the pleat tips where the pleated media may contact the depth media on the outer periphery of the pleated filter media ring.

Turning in greater detail to the filter media 46 as can be seen particularly with reference to FIGS. 2-4, it is seen that multiple layers are provided within the filter media 36 in order to provide an extended life span in this embodiment. For example, the filter media 46 may include a pleated filter media ring 50 and an upstream prefilter that may take the form of a foam sleeve 52 on the upstream surface of the pleated filter media ring. For example, as shown, the foam sleeve 52 may be disposed in surrounding relation of the pleated filter media ring 50. Preferably, both the foam sleeve and the pleated filter media ring are potted within the plastisol within the top and bottom end caps 38, 40. As the foam sleeve 52 does comprise compressible foam material, the ends thereof may be slightly compressed radially to fit within the dimensions of the outer dimensions of the top and bottom end caps and may with the foam extending slightly beyond the outer diameter thereof (the outer diameter of the foam may be bigger than that of the end caps).

The foam sleeve may have a convoluted outer surface 53 so as to provide ridges and valleys making upward and downward cone shapes to increase the overall surface area and thereby allow for more dust holding capacity as a whole (e.g. increasing the inlet surface area along the upstream surface of the filter media 36). The surface facing and resting against the pleat tips of the pleated filter media ring 50 may be flat (in the unwound state). Flat foam pads can be heat seamed or sealed along the length of the foam to create a tubular and cylindrical foam sleeve 52 as illustrated.

The foam sleeve 52 is preferably a polyurethane foam packing which may take one of several different forms such as polyester-based polyurethane foam; polyether-based polyurethane foam; reticulated polyurethane foam; reticulated polyester; reticulated polyethers; reconstituted foams; and the like (all generically referred to herein as "polymeric foam"). Most preferably, and for a particular application envisioned herein for locomotive applications, a reticulated polyether-blended foam sleeve may be desirable. The foam sleeve 52 is designed preferably to operate as primarily a depth-loading filter in that it loads substantially throughout the depth of the medium rather than primarily upon the surface of the foam sleeve. Thus, the pore size for the foam sleeve is chosen relative to the anticipated particulates or contaminates that is expected in a given application. In the case of locomotives, and for purposes herein, ASHRAE test dust has been chose which is believed to simulate what would typically be expected in the filed. ASHRAE test dust is somewhat large dust particles comprising a large percentage by weight of ordinary dust of substantial size (72% standardized air cleaner test dust, fine—mean particle size 7.7 microns); a significant portion of powdered carbon to simulate soot that is expected to be produced in a locomotive engine environment (e.g. 23% powdered carbon); and a small percentage of cotton linters (5% #7 cotton linters). For example, ASHRAE test dust has the following additional reported particulars:

| 72% ISO 12103-1, A2 FINE TEST DUST | | |
|---|---|---|
| Chemical Ingredient | CAS Number | % of Weight |
| $SiO_2$ | 14808-60-7 | 68-76 |
| $Al_2O_3$ | 1344-28-1 | 10-15 |
| $Fe_2O_3$ | 1309-37-1 | 2-5 |
| $Na_2O$ | 1313-59-3 | 2-4 |
| CaO | 1305-78-8 | 2-5 |
| MgO | 1309-48-4 | 1-2 |
| $TiO_2$ | 13463-67-7 | 0.5-1.0 |
| $K_2O$ | 12136-45-7 | 2-5 |

| 23% CARBON BLACK POWDER | | |
|---|---|---|
| Chemical Ingredient | CAS Number | % of Weight |
| Carbon Black Powder | 1333-86-4 | 100.0 |

| 5% MILLED COTTON LINTERS | | |
|---|---|---|
| Chemical Ingredient | CAS Number | % of Weight |
| Second-Cut Cotton Linters | 9004-34-6 | 100.0 |

With ASHRAE test dust, it has been found that utilizing a foam material with between about 15 and 25 pore per inch is beneficial. Most preferably, around 20 pore per inch is particularly beneficial. With the ASHRAE test dust, it was found that with above 25 pore per inch, the media was too tight causing excessive surface loading on the prefilter and thereby causing a low life span; whereas at 15 PPI with ASHRAE test dust, the prefilter media was found to be too open and therefore passing too many particulates through and causing internal clogging within the filter media.

Turning to the pleated filter media ring 50, it can be seen in FIG. 4 that an embodiment preferably comprises multiple layers including a substrate 54 and a fine fiber layer 56 to provide an efficiency layer which determines the maximum particle capture efficiency for the filter media (e.g. capturing the smallest particles). The substrate 54 may be a cellulose-based substrate, also referred to as filter paper. However, unlike the filter paper used in prior models, in a retrofit application, the filter paper is preferably more open and conducive to air flow (and less efficient at capturing dust particles). For example, for locomotive applications, the substrate may have a Frazier permeability target of greater than about 85 CFM and more preferably around at least 100 target CFM. By target, it is meant that that is what is intended to be reached, as it will be appreciated that due to manufacturing tolerances an exact Frazier permeability may vary. For example, for 100 target Frazier permeability, actual permeability may range between 80 to 120 CFM. The basis weight of the cellulose filter paper substrate 54 is not of as much consequence and preferably is between about 25 and 150 pounds per 3000 square feet.

The fine fiber layer 56 may be formed by different methods including melt blowing or other technologies that can create fine fibers. A most preferred method for making fine fibers is electrospinning such as disclosed in US Patent Publication Nos. 2009/0199717 entitled FILTRATION MEDIAS, FINE FIBERS UNDER 100 NANOMETERS AND METHODS; and 2009/0126333 entitled FINE FIBER ELECTROSPINNING EQUIPMENT, FILTER MEDIA AND METHOD, the entire disclosures of which are hereby incorporated by reference in their entireties to the extent consistent with the present disclosure (and not for contradicting or otherwise limiting the present disclosure). The relatively light application of fine fibers is desired for the particular locomotive application according to one of the embodiments herein. For example, the nanofiber fine fiber layer 56 is preferably on the upstream surface of the substrate 54 to prevent clogging of the porosity in the structural support of the substrate 54 during particulate loading. In this manner, the fine fiber layer 56 tends to act as a surface filter and in defining the overall particle size capture efficiency for the filter media 36 as a whole. The nanofiber preferably comprises nanofibers having a diameter of less than about 500 nanometers (and an application coverage of less about 0.1 grams per square meter). For the locomotive applications, the application weight may even more preferably be below 0.04 grams per square meter and it is contemplated to have a low coverage level of between 0.01 and 0.02 grams per square meter while still meeting the objectives in one of the embodiments relating to a locomotive application/system.

With filter elements according to embodiments of the present invention, there is enabled a method for providing an extended service interval for a predetermined filter housing envelope of a filter housing (such as in existing locomotive applications for filtration of air flow to electrical cabinets). In such existing applications, these filters will have originally contained at one point in time, first filter elements that were designed for a much shorter change-out interval. By installing new filter elements such as those discussed above, one can install the new filter elements into the housing to fill out the same predetermined filter housing element envelope. By using the filter elements 10, the method can at least approximately double the replacement service interval with the new filter elements as compared with the original filter elements while at the same time at least approximately doubling the dust holding capacity while approximately maintaining the same or less air flow resistance at that dust holding capacity. These significant new methods and advantages are discussed in further detail in the examples below along with the attached graphs of FIGS. 6-9.

For replacing the Clark Filter AA-1 and AE-1 models, generally, the pleated filter media ring of an extended life filter element 10 to be suitable for filtering an electrical cabinet on existing locomotive applications may include the following size parameters: a pleat depth of between 1 and 3 inches; an inner diameter of at least about 4 inches; an outer diameter of less than about 10 inches; and an axial length of between 10 inches and 20 inches. Given that the volume occupied (e.g. filter envelope) of the AE-1 is larger than the AA-1, more particular parameters will be provided for different envelopes along with dust holding characteristic parameter examples of an embodiment indicated in parenthesis.

For the AA-1 model, the parameters may generally include the following: a pleat depth of between 1 and 2 inches (e.g. 1.4 inches); an inner diameter of at least about 4 inches (e.g. 4.75 inches); an outer diameter of less than about 10 inches (e.g. 8 inches); and an axial length of between 11 inches and 13 inches (e.g. 12.375 inches). The substrate has a surface area of at least 30 square feet and less than 45 square feet, with about 38 square feet in one embodiment. The prefilter foam sleeve may have a thickness of about ½ inch. With the examples provided, the overall filter element, according to an embodiment of the present invention, has a dust holding capacity of at least 200 grams of ASHRAE dust (more preferably at least about 280 grams of dust holding capacity) with an average arrestance of at least 95% (preferably at least 99%), with a resistance of less than 10 water gauge pressure according to ASHRAE Method 52.1-1992 at an airflow rate of 400 CFM.

For the AE-1 model, the parameters may generally include the following: a pleat depth of between 1 and 3 inches (e.g. 1.725 inches); an inner diameter of at least about 4 inches (e.g. 4.84 inches); an outer diameter of less than about 10 inches; and an axial length of between 15 inches and 17 inches e.g. 16 inches). The substrate has a surface area of at least 63 square feet and less than 79 square feet, with about 71 square feet in one embodiment. The prefilter foam sleeve may have a thickness of ½ inch. With the examples provided, the filter element, according to an embodiment of the present invention, has a dust holding capacity of at least 500 grams of ASHRAE dust (more preferably at least about 634 grams of dust holding capacity), an average arrestance of at least 95% (preferably at least 99%), with a resistance of less than 10 water gauge according to ASHRAE Method 52.1-1992 at an airflow rate of 400 CFM.

EXAMPLES

In the examples listed below ASHRAE test dust was used and ASHRAE standard 52.1-1992 was employed with a single filter element in a test cell. Maximum tolerable pressure drop was 10 inches in water gauge which determined when a filter was loaded to capacity. The dust feed increment was 2.0 grams/1000 cubic feet, with an air flow of 400 CFM.

Example 1

Prior Art AA-1 Model (Made by Clark Filter, Inc.)

Figure 6:
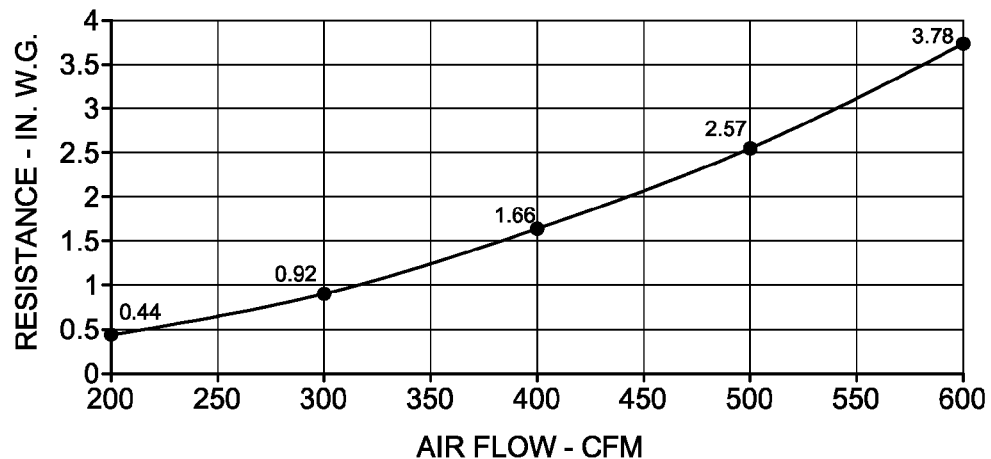
FIG. 6 is a diagram showing an existing prior art airflow diagram for an AA-1 Clark cartridge filter showing air flow vs. resistance.

For purposes of comparison (and for development of an extended life filter), an existing AA-1 model filter available from the present assignee Clark Filter was tested for air flow. This filter employed a single layer of pleated filter media having the following reported or analyzed characteristics: a Frazier permeability of between 64-92 CFM (target of 78), a target caliper thickness of 0.029 inch, and a target basis weight of 76 pounds/3000 square feet. The effective media area was determined to be 34.63 square feet (with generally the same dimensions to those listed above for the AA-1). The total dust holding capacity was measured to be about 122 grams with an average arrestance of 99.4%. For the clean filter, the resistance versus air flow was depicted in FIG. 6 illustrating how the filter behaves when subjected to increased air flow.

Example 2

Extended Life AA-1 Filter According to an Embodiment of the Present Invention

A filter element having a general configuration as that illustrated in FIGS. 1-4 was prepared (with generally the same dimensions to those listed above for the AA-1 model). The substrate was selected to have the following characteristics: a Frazier permeability of between 80-120 CFM (target of 100), a target caliper thickness of 0.020 inch, and a target basis weight of 77.5 pounds/3000 square feet. The effective media area in a pleated configuration was determined to be 37.97 square feet. The substrate had an upstream efficiency layer of Protura® nylon nanofibers available from the present assignee and produced generally in accordance with aforementioned U.S. Published Applications. Coverage level of the nanofibers was 0.03 grams/square meter with an average nanofiber diameter of between about 100 and 150 nanometers. A ½ inch thick reticulated polyether blended foam sleeve with a porosity of 20 pore per inch with a convoluted outer surface was arranged about the pleated filter media ring.

Figure 7:
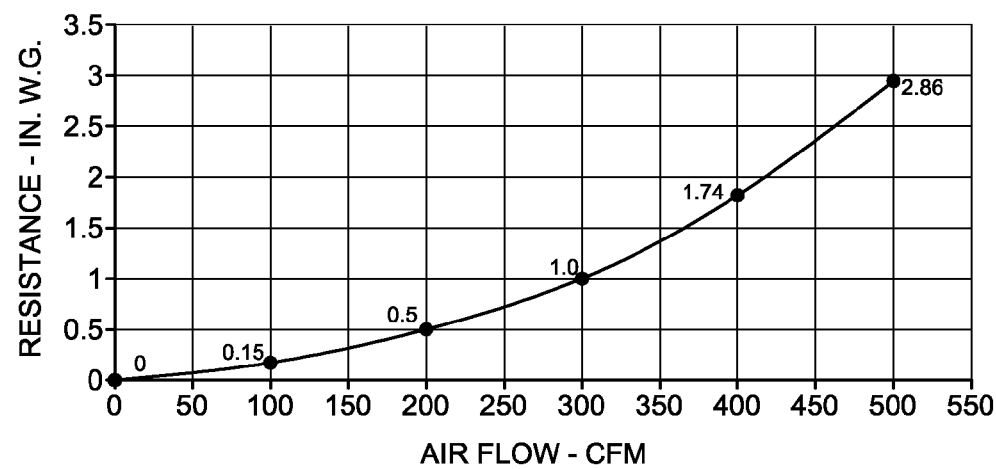
FIG. 7 is a diagram similar to FIG. 6 but for the new and improved filter element according to an embodiment of the present invention having extended dust-holding capacity.
Figure 8:
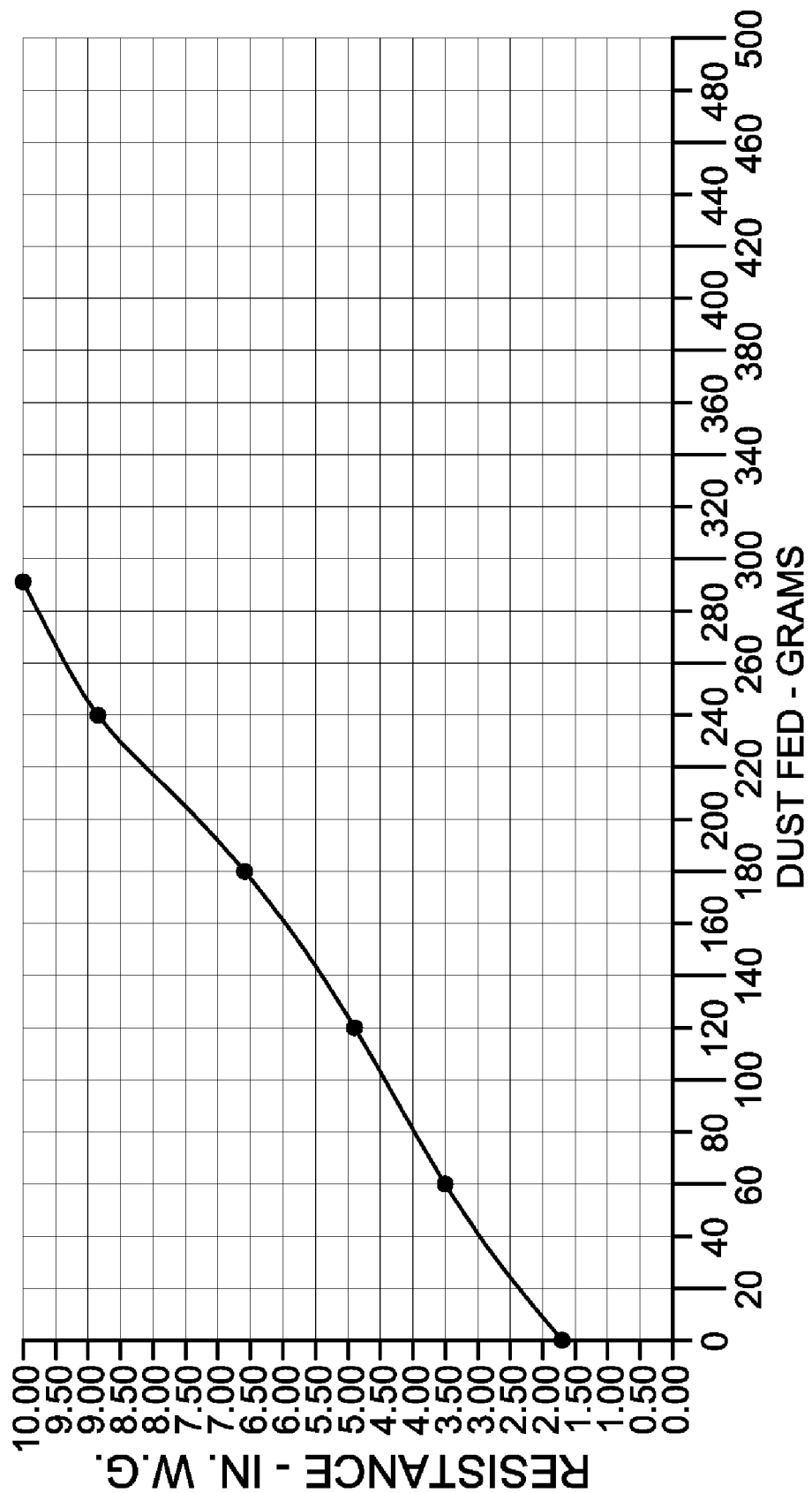
FIG. 8 is a dust-fed vs. resistance graph for a new and improved filter according to an embodiment of the present invention for the same filter graphed in FIG. 7.
Figure 9:
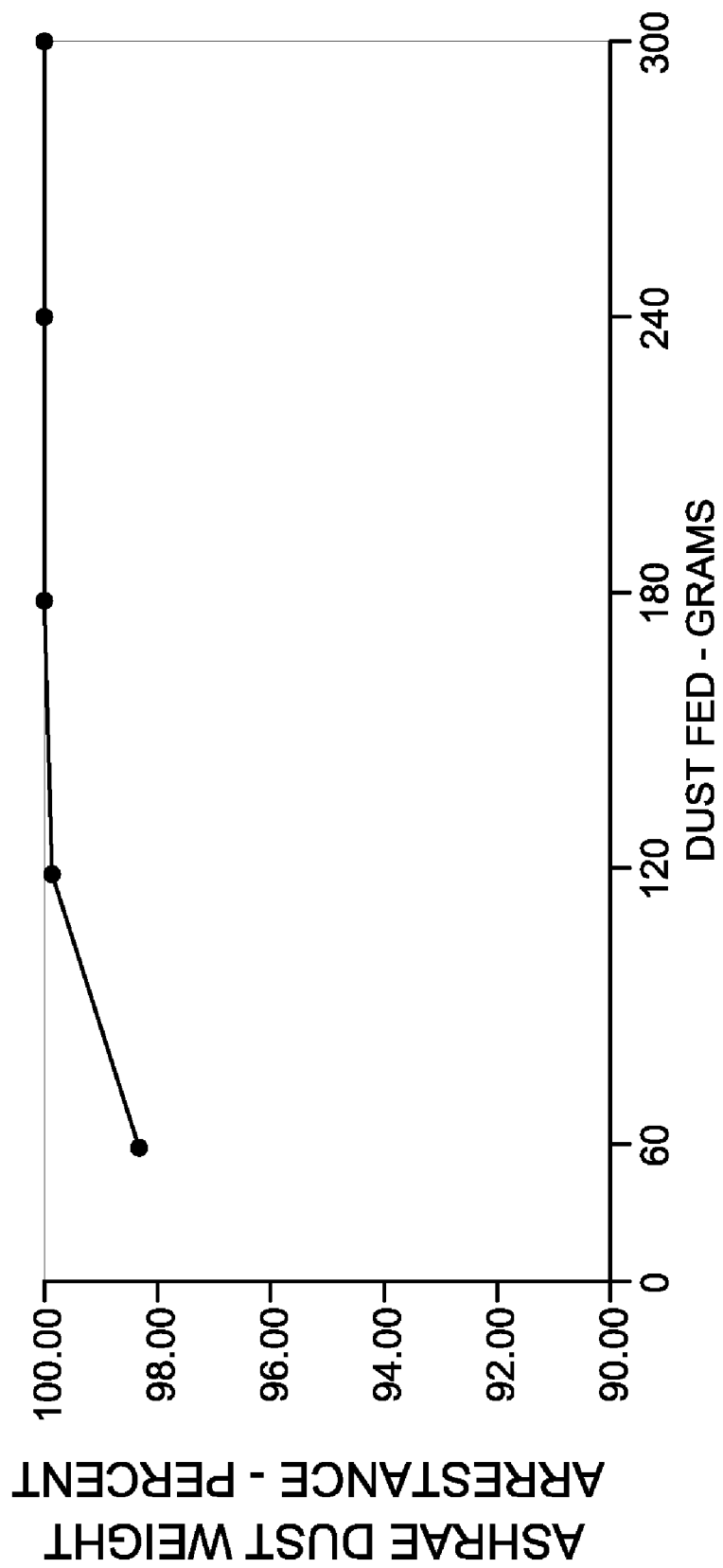
FIG. 9 is a graph illustrating the dust-fed vs. arrestance for the new and improved filter element according to that graphed for FIGS. 7 and 8.

Testing indicated this filter had dust holding capacity was measured to be about 282 grams with an average arrestance of 99.6%. For the clean filter, the resistance versus air flow was depicted in FIG. 7 illustrating how the filter behaves when subjected to increased air flow (thus comparable to original element despite much higher dust loading capacity). The dust fed versus resistance data is shown in FIG. 8; and the dust fed versus arrestance is shown in FIG. 9. It should be noted that efficiency generally improves as the filter loads as dust cake on a filter media itself tends to act as a filter and remove particulate. At the end of testing, inspection of the foam layer showed that the foam depth loaded in a fairly consistent manner throughout the depth of the foam layer.

Example 3

Another example and embodiment with a configuration similar to example 2 was tried except with a foam having 15 pore per inch. This foam for ASHRAE dust was effective for increasing life span but found less effective than that of Example 2. After testing, inspection showed that too much of the dust passed through the foam and surface loaded on the filter substrate. It is believed this caused premature filter failure. While useful in extending life, and advantageous, this example is not optimal as Example 2.

Example 4

Another example and embodiment with a configuration similar to example 2 was tried except with a foam having 25 pore per inch. This foam for ASHRAE dust was effective for increasing life span but found less effective than that of Example 2. After testing, inspection showed that not enough dust entered the foam and surface loaded on the foam. It was believe this caused premature filter failure. While useful in extending life, and advantageous, this example is not optimal as Example 2.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for providing an extended replacement service interval for a predetermined filter housing envelope of a filter housing, originally containing first filter elements having a single pleated filter media filling out the predetermined filter housing envelope, comprising:
   installing second filter elements into the filter housing to fill out the predetermined filter housing envelope;
   selecting second filter elements having the following characteristics:
   a pleated filter medium having a greater air permeability than the single pleated filter media;
   a prefilter adapted to a depth load upstream of the pleated filter mediun reduce loading on the pleated filter medium; and
   employing the second filter elements in an air filtration application filtering dust from an air stream of at least 300 CFM to an electrical cabinet on a locomotive.

2. The method of claim 1, wherein said selected characteristics further includes an efficiency layer on the pleated filter medium, the efficiency layer comprising fibers having an average diameter less than 500 nanometers.

3. The method of claim 2, wherein the method comprises:
   at least doubling the replacement service interval with the second filter elements as compared with the first filter elements; while at the same time; and
   at least doubling the dust holding capacity while approximately maintaining the same or less air flow resistance at the dust holding capacity.

4. The method of claim 1, wherein the pleated filter medium includes following characteristics:
   a pleat depth of between 1 and 3 inches;
   an inner diameter of at least about 4 inches;
   an outer diameter of less than about 10 inches; and
   an axial length of between 10 inches and 20 inches.

5. The method of claim 3, wherein the at least approximately doubling the dust holding capacity is at least double.

6. The method of claim 1, wherein each second filter element includes:
   a filter media ring, the filter media including a substrate and an efficiency layer disposed on a surface of the substrate, the filter media ring having a pleated configuration to provide the pleated filter medium;
   first and second end caps disposed on opposing ends of the of filter media ring, and
   the prefilter being disposed along an upstream surface of the filter media ring.

7. The method of claim 6, wherein the prefilter comprises a depth filter medium having a particle capture efficiency less than the efficiency layer, the efficiency layer having a higher particle capture efficiency than the substrate, the efficiency layer being on an upstream surface of the substrate.

8. The method of claim 6, wherein the prefilter is a polymeric foam having a thickness of greater than about ¼ inch and less than about 1 inch and a porosity of between 15 and 25 pore per inch.

9. The method of claim 8, wherein the porosity is about 20 pore per inch, and wherein the polymeric foam has an exterior surface that is convoluted.

10. The method of claim 8, wherein the polymeric foam is a reticulated polyether foam.

11. The method of claim 8, wherein the substrate has a Frazier permeability target of greater than about 85 CFM and a basis weight of between 25 and 150 pounds/3000 square feet.

12. The method of claim 11, wherein the efficiency layer is a nanofiber layer on an upstream surface of the substrate, the nanofiber layer comprising fine fibers having an average diameter of less than about 500 nanometers, and an application coverage of less than 0.1 grams per square meter.

13. The method of claim 6, further comprising a cylindrical expanded metal support ring supporting a radially inside surface of the filter media ring; and wherein the prefilter is in the form of a foam sleeve disposed directly on a radially outside surface of the filter media ring, and wherein the foam sleeve and the filter media ring are potted to the first and second end caps, at least one of the end caps integrally providing or having attached thereto a ring seal gasket.

14. The method of claim 13, wherein the filter element is free of an outer expanded metal wrapper along the radially outside surface of the filter media ring.

15. A method for providing an extended replacement service interval for a predetermined filter housing envelope of a filter housing, originally containing first filter elements having a single pleated filter media filling out the predetermined filter housing envelope, comprising:
   installing second filter elements into the filter housing to fill out the predetermined filter housing envelope;
   selecting second filter elements having the following characteristics:
   a pleated filter medium having a greater air permeability than the single pleated filter media;
   a prefilter adapted to depth load upstream of the pleated filter medium to reduce loading on the pleated filter medium; and
   wherein each second filter element includes:
   a filter media ring, the filter media including a substrate and an efficiency layer disposed on a surface of the substrate, the filter media ring having a pleated configuration to provide the pleated filter medium;
   first and second end caps disposed on opposing ends of the of filter media ring, and
   the prefilter being disposed along an upstream surface of the filter media ring wherein the filter media ring in the pleated configuration is in a generally cylindrical configuration adapted for filtering an electrical cabinet on locomotive applications and includes the following characteristics: a pleat depth of between 1 and 2 inches; an inner diameter of at least about 4 inches; an outer diameter of less than about 10 inches; and an axial length of between 11 inches and 13 inches; the substrate having a surface area of at least 30 square feet and less than 45 square feet, wherein the filter element has a dust holding capacity of at least 200 grams of ASHRAE dust with an average arrestance of at least 95%, and a resistance of less than 10 water gauge pressure according to ASHRAE Method 52.1-1992 at an airflow rate of 400 CFM.

16. A method for providing an extended replacement service interval for a predetermined filter housing envelope of a filter housing, originally containing first filter elements having a single pleated filter media filling out the predetermined filter housing envelope, comprising:

installing second filter elements into the filter housing to fill out the predetermined filter housing envelope;

selecting second filter elements having the following characteristics:

a pleated filter medium having a greater air permeability than the single pleated filter media;

a prefilter adapted to depth load upstream of the pleated filter medium to reduce loading on the pleated filter medium; and wherein each second filter element includes:

a filter media ring, the filter media including a substrate and an efficiency layer disposed on a surface of the substrate, the filter media ring having a pleated configuration to provide the pleated filter medium;

first and second end caps disposed on opposing ends of the filter media ring, and the prefilter being disposed along an upstream surface of the filter media ring wherein the filter media ring in the pleated configuration is in a generally cylindrical configuration adapted for filtering an electrical cabinet on locomotive applications and includes the following characteristics: a pleat depth of between 1 and 3 inches; an inner diameter of at least about 4 inches; an outer diameter of less than about 10 inches; and an axial length of between 15 inches and 17 inches; the substrate having a surface area of at least 63 square feet and less than 79 square feet, wherein the filter element has a dust holding capacity of at least 500 grams of ASHRAE dust, an average arrestance of at least 95%, with a resistance of less than 10 water gauge according to ASHRAE Method 52.1-1992 at an airflow rate of 400 CFM.

17. A method for providing an extended replacement service interval for a predetermined filter housing envelope of a filter housing, comprising:

installing at least one filter element into the filter housing to fill out the predetermined filter housing envelope;

selecting the at least one filter element to have the following characteristics:

a pleated filter medium; and a prefilter adapted to depth load upstream of the pleated filter medium to reduce loading on the pleated filter medium; and employing the at least one filter element in an air filtration application filtering dust from an air stream of at least 300 CFM to an electrical cabinet on a locomotive.

18. The method of claim 17, wherein the method further comprises extending the replacement service interval by replacing the at least one filter element instead of first filter elements that were originally installed in the filter housing, the first filter elements having a pleated filter media without the prefilter.

19. The method of claim 18 further comprising:

at least doubling the replacement service interval with the second filter elements as compared with the first filter elements; while at the same time; and at least doubling the dust holding capacity while approximately maintaining the same or less air flow resistance at the dust holding capacity.

20. The method of claim 17, wherein the at least one filter element comprises a filter media ring, the filter media including a substrate and an efficiency layer disposed on a surface of the substrate, the filter media ring having a pleated configuration to provide the pleated filter medium;

first and second end caps disposed on opposing ends of the filter media ring, and the prefilter being disposed along an upstream surface of the filter media ring.

21. The method of claim 20, wherein the prefilter comprises a depth filter medium having a particle capture efficiency less then the efficiency layer, the efficiency layer having a higher particle capture efficiency than the substrate, the efficiency layer being on an upstream surface of the substrate, wherein the prefilter is a polymeric foam having a thickness of greater than about ¼ inch and less than about 1 inch and a porosity of between 15 and 25 pore per inch, wherein the substrate has a Frazier permeability target of greater than about 85 CFM and a basis weight of between 25 and 150 pounds/3000 square feet.

22. The method of claim 20, wherein the efficiency layer is a nanofiber layer on an upstream surface of the substrate, the nanofiber layer comprising fine fibers having an average diameter of less than about 500 nanometers, and an application coverage of less than 0.1 grams per square meter, wherein the substrate has a Frazier permeability target of greater than about 85 CFM and a basis weight of between 25 and 150 pounds/3000 square feet.

* * * * *